Patented Feb. 28, 1939

2,149,236

UNITED STATES PATENT OFFICE 2,149,236

AZODYESTUFFS INSOLUBLE IN WATER AND FIBER DYED THEREWITH

Karl Zahn and Kurt Schimmelschmidt, Frankfort-on-the-Main-Hochst, Germany, assignors to General Aniline Works, Inc., New York, N. Y., a corporation of Delaware No Drawing. Application February 15, 1937, Serial No. 125,937. In Germany February 21, 1936

10 Claims. (Cl. 260—152)

The present invention relates to azo-dyestuffs insoluble in water and to fiber dyed therewith; more particularly, it relates to dyestuffs of the following general formula:

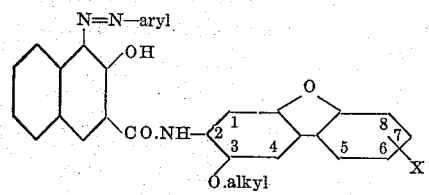

wherein X stands for hydrogen, alkyl, alkoxy or halogen.

We have found that valuable water-insoluble azo-dyestuffs of good properties of fastness are obtainable by coupling in substance, on the fiber or on a substratum adapted for the production of lakes, any diazo-compounds with 2-(2',3'-hydroxynaphthoylamino) - 3 - alkoxydiphenylene - oxides which may be substituted in 5-, 6-, 7- or 8-position of the diphenylene oxide nucleus by, for instance, halogen, alkyl or alkoxy groups, only such dyestuff components being used as do not contain any group lending solubility, such as the sulfonic acid or carboxylic acid group.

When producing the azo-dyestuffs on the fiber there are obtained at normal proportions of concentration intense dyeings of good properties of fastness, particularly of very good fastness to light. Many of the dyestuffs have valuable tints so that they offer a high technical interest as pigment dyes when produced in substance and as developing dyestuffs when produced on the fiber. Thus, for instance, the 2-(2',3'-hydroxynaphthoylamino)-3-methoxydiphenylene-oxide yields when used as grounding component on cotton with a great number of diazo-compounds as developers vivid dyeings which considerably surpass the dyeings obtained from 2-(2',3'-hydroxynaphthoylamino) - diphenylene - oxide as described in British Patent No. 374,548, particularly as regards their fastness to light. Moreover, the dyestuff obtainable by this invention by coupling 2 - (2',3' - hydroxynaphthoylamino)-3-methoxy-diphenylene-oxide with the diazonium compound of 2-amino-4,4'-dichlorodiphenylether is distinguished by its very good fastness to light and by its very clear yellowish red tint which was unattainable of this degree of fastness in the range hitherto on the market.

The 2-(2',3'-hydroxynaphthoylamino) - 3 - alkoxy-diphenylene-oxides and their substitution products, respectively, used as coupling components may be prepared according to the process of our co-pending U. S. patent application Serial No. 125,679½ filed February 15, 1937, for "Arylides of 2,3-hydroxynaphthoic acid and process of preparing them."

The following examples serve to illustrate the invention, but they are not intended to limit it thereto: the parts are by weight, unless stated otherwise:—

(1) 1.24 grams of 2-(2',3'-hydroxynaphthoyl amino)-3-methoxydiphenylene-oxide are dissolved in 2.5 cc. of alcohol and 0.38 cc. of caustic soda solution of 34° Bé. and 0.38 cc. of a formaldehyde solution of 30% strength, and 2.5 cc. of a glue solution 1:10 are added.

This mixture is made up with 10 cc. of Turkey red oil of 50 per cent strength, 10 cc. of caustic soda solution of 34° Bé. and water to 1 liter solution.

From this bath the arylide is taken up by 50 grams of boiled cotton yarn to the extent of about 70 per cent.; it yields by treatment with a developing solution made by diazotizing 3.4 grams of 2 - amino - 4,4' - dichlorodiphenylether and subsequently rinsing and soaping at boiling temperature, an intense very clear yellowish red tint of very good fastness to light. The dyestuff corresponds with the following formula:

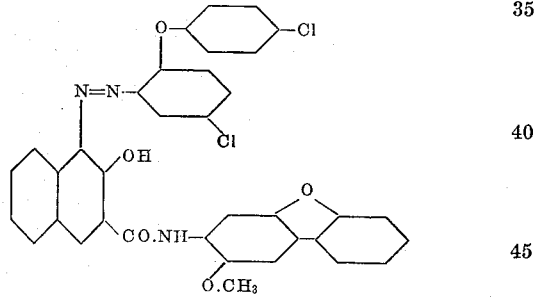

(2) A diazo-solution made in the usual manner from 25.4 parts of 2-amino-4,4'-dichlorodiphenylether is run into an aqueous suspension of 38.3 parts of 2-(2',3'-hydroxynaphthoylamino)-3-methoxydiphenylene-oxide prepared by dissolving this arylide in alcoholic caustic soda solution, diluting with water and neutralizing with acetic acid. When the coupling is finished, the dyestuff is filtered with suction, washed until neutral and dried. The dry dyestuff is a red powder.

Dyestuffs of similar properties of fastness are obtained by substituting for the arylide used in the examples the corresponding substitution products. Instead of the diazo-compounds named in the examples other diazo-, tetrazo- or diazoazo-compounds may be used.

The following table indicates a number of other azo-dyestuffs obtainable by this invention:

| | Diazo component | Coupling component | Tint |
|---|---|---|---|
| 1 | 5-bromo-4-chloro-2-amino-1-methylbenzene | 2-(2', 3'-hydroxynaphthoylamino)-3-methoxydiphenyleneoxide | Vivid bluish red. |
| 2 | 4,6-dichloro-2-amino-1-methylbenzene | do | Yellow red. |
| 3 | 4-chloro-2-amino-1-methylbenzene | do | Vivid yellowish red. |
| 4 | 5-chloro-2-amino-1-methylbenzene | do | Vivid bluish red. |
| 5 | 3-nitro-4-amino-1-methylbenzene | do | Bordeaux. |
| 6 | 5-nitro-2-amino-1-methylbenzene | do | Vivid Bordeaux. |
| 7 | 4-nitro-2-amino-1-methylbenzene | do | Scarlet. |
| 8 | 2,5-dichloraniline | do | Do. |
| 9 | 2-nitro-aniline | do | Yellow brown. |
| 10 | 5-chloro-2-amino-1-methylbenzene | 2-(2', 3'-hydroxynaphthoylamino)-3-ethoxydiphenyleneoxide | Vivid scarlet red. |
| 11 | 2,5-dichloraniline | do | Yellowish scarlet. |
| 12 | 4-nitro-2-methoxy-1-aminobenzene | do | Bordeaux red. |
| 13 | 2,4-dimethyl-1-aminobenzene | 2-(2', 3'-hydroxynaphthoylamino)-7-methyl-3-methoxydiphenylene oxide | Vivid bluish red. |
| 14 | 5-chloro-2-amino-1-methylbenzene | 2-(2', 3'-hydroxynaphthoylamino)-3, 7-dimethoxydiphenylene oxide | Bordeaux red. |
| 15 | 4-chloro-2-amino-1-methoxybenzene | do | Do. |
| 16 | 5-methyl-2-amino-1-nitrobenzene | do | Bordeaux. |
| 17 | 5-chloro-2-amino-1-nitrobenzene | do | Do. |
| 18 | 4-nitro-2-methoxy-1-aminobenzene | do | Do. |
| 19 | 3-chloraniline | do | Brown red. |
| 20 | 2,5-dichloraniline | 2-(2', 3'-hydroxynaphthoylamino)-7-chloro-3-methoxydiphenylene oxide | Brick-red. |
| 21 | 4,4'-dichloro-2-aminodiphenylether | do | Yellow red. |
| 22 | 5-trifluoromethyl-1-aminophenyl-2-ethylsulfone | do | Yellow brown. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We claim:
1. The water-insoluble azo-dyestuffs of the following general formula:

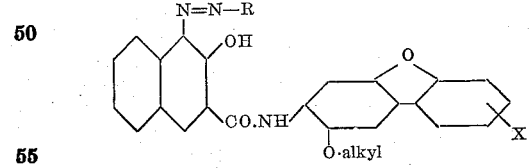

wherein R stands for a radical free from sulfonic and carboxylic acid groups selected from the group consisting of phenyl and phenyl substituted by mono-valent radicals which is linked directly to the azo-group and X stands for a member of the group, consisting of hydrogen, methyl, chlorine and alkoxy, yielding, when produced on the fiber, scarlet, red and Bordeaux shades of good fastness properties, particularly of very good fastness to light.

2. The water-insoluble azo-dyestuffs of the following general formula:

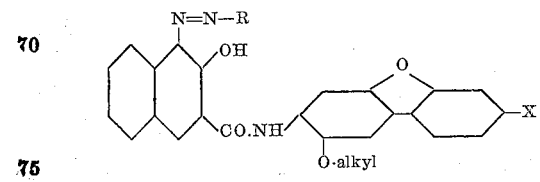

wherein R stands for a radical free from sulfonic and carboxylic acid groups selected from the group consisting of phenyl and phenyl substituted by mono-valent radicals which is linked directly to the azo-group and X stands for a member of the group, consisting of hydrogen, methyl, chlorine and alkoxy, yielding when produced on the fiber, scarlet, red and Bordeau shades of good fastness properties, particularly of very good fastness to light.

3. The water-insoluble azo-dyestuff of the following formula:

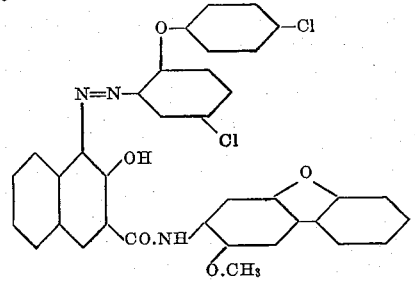

yielding, when produced on the fiber, an intense very clear yellowish-red shade of good fastness properties, particularly of very good fastness to light.

4. The water-insoluble azo-dyestuff of the following formula:

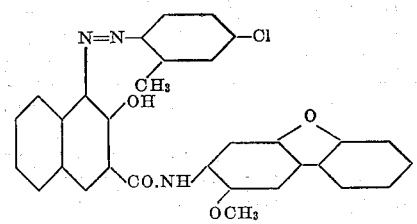

yielding, when produced on the fiber, a vivid bluish-red shade of good fastness properties, particularly of very good fastness to light.

5. Fiber dyed with the water-insoluble azo-dyestuffs as claimed in claim 1.
6. Fiber dyed with the water-insoluble azo-dyestuffs as claimed in claim 2.
7. Fiber dyed with the water-insoluble azo-dyestuff as claimed in claim 3.
8. Fiber dyed with the water-insoluble azo-dyestuff as claimed in claim 4.

9. The water-insoluble azo-dyestuff of the following formula:
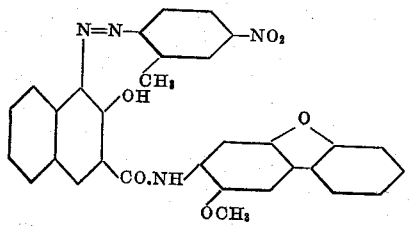
yielding, when produced on the fiber, a vivid Bordeaux shade of good fastness properties, particularly of very good fastness to light.
10. Fiber dyed with the water-insoluble azo-dyestuff as claimed in the claim 9.
KARL ZAHN.
KURT SCHIMMELSCHMIDT.